United States Patent [19]
Humphries et al.

[11] 3,804,438
[45] Apr. 16, 1974

[54] PIPE INSULATION SYSTEM

[75] Inventors: Darral V. Humphries, Allentown; James F. Kostecky, Bethlehem, both of Pa.

[73] Assignee: Bethlehem Steel Corporation, Bethlehem, Pa.

[22] Filed: Aug. 9, 1972

[21] Appl. No.: 273,660

[52] U.S. Cl................................. 285/47, 285/138
[51] Int. Cl............................................. F16l 59/14
[58] Field of Search ................. 285/47, 48, 49, 50; 138/149, 143, 118; 156/139

[56] References Cited
UNITED STATES PATENTS

| | | | |
|---|---|---|---|
| 3,557,840 | 1/1971 | Maybee | 138/149 |
| 2,831,359 | 4/1958 | Carle | 156/139 |
| 2,651,058 | 9/1953 | Almoslino | 182/163 |
| 3,473,575 | 10/1969 | Vogelsang | 138/149 |
| 3,068,026 | 12/1962 | McKamey | 285/47 |
| 1,871,508 | 8/1932 | Gardner | 138/149 |
| 1,734,209 | 11/1929 | Huffine | 138/149 |

*Primary Examiner*—Reinaldo P. Machado

[57] ABSTRACT

A prefabricated deformable laminated insulation panel for use in fluid conduit construction and/or an insulated pipeline system. The laminated panel comprises an outer skin, truncated prisms of insulating material having one base adhered to the outer skin and a relatively lighter inner skin adhered to the sides and the other base of the truncated prisms and to the outer skin, and means for spacing the insulation panel from and supporting the panel on the insulated pipe. The insulation panels are deformable about various shapes and sizes of pipe to provide an efficient insulation structure.

20 Claims, 23 Drawing Figures

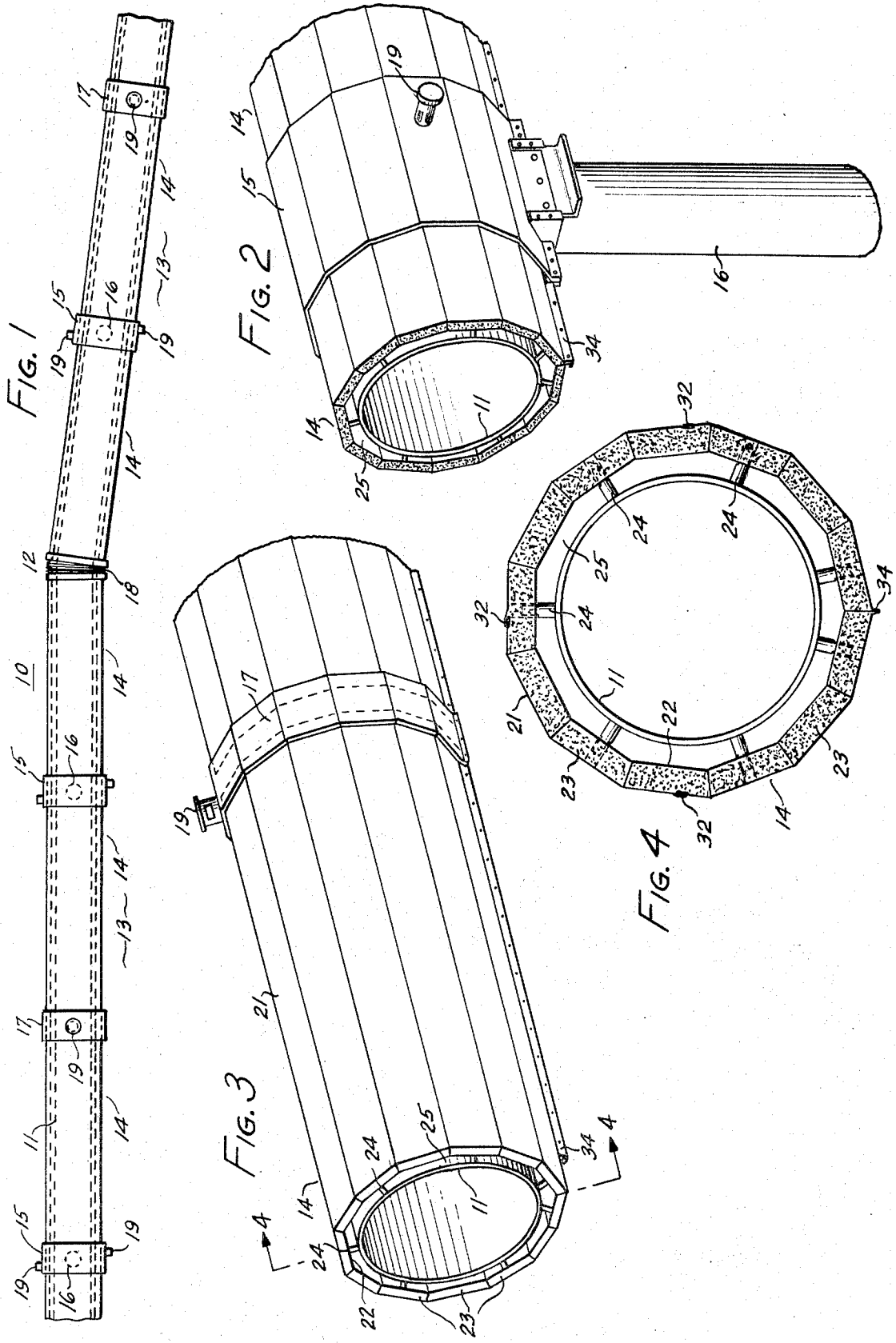

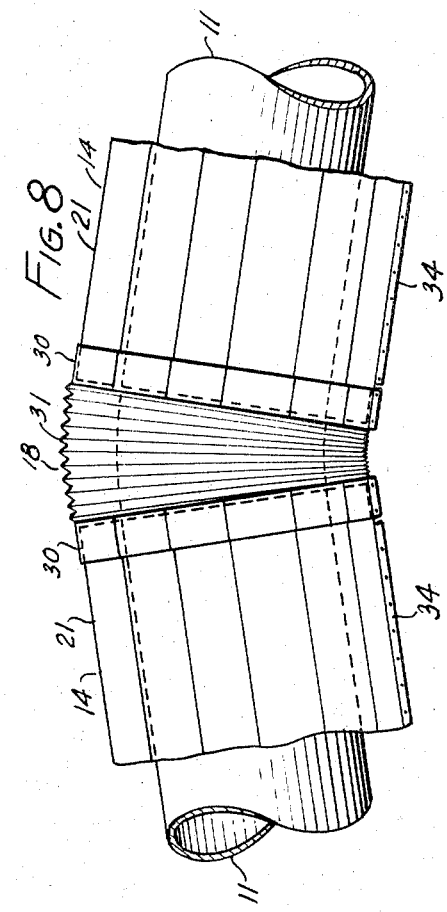
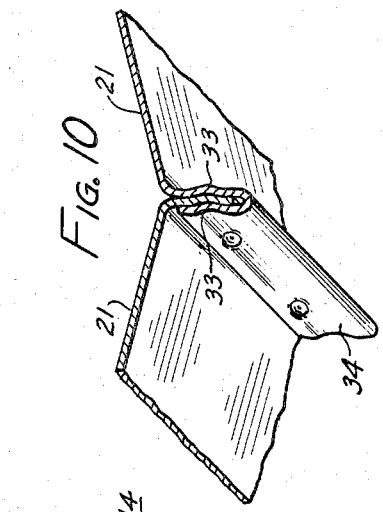
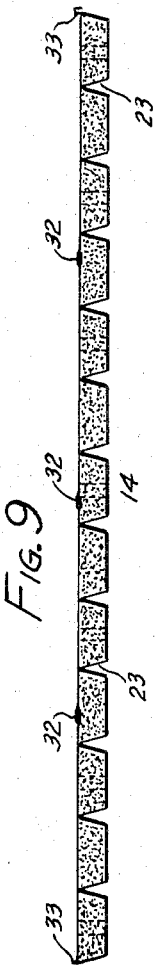
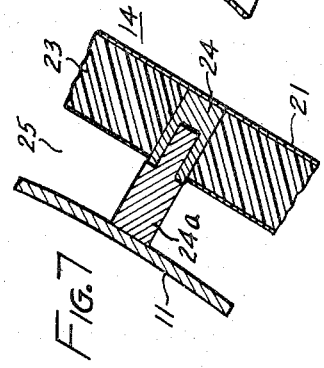
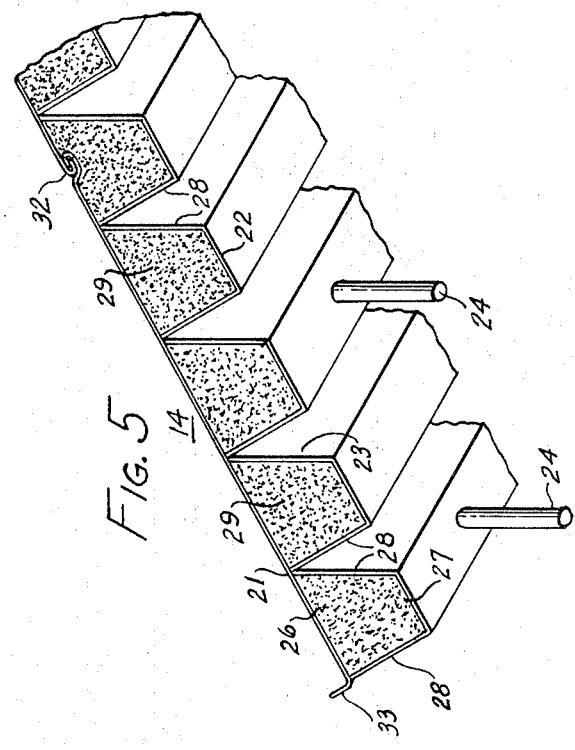
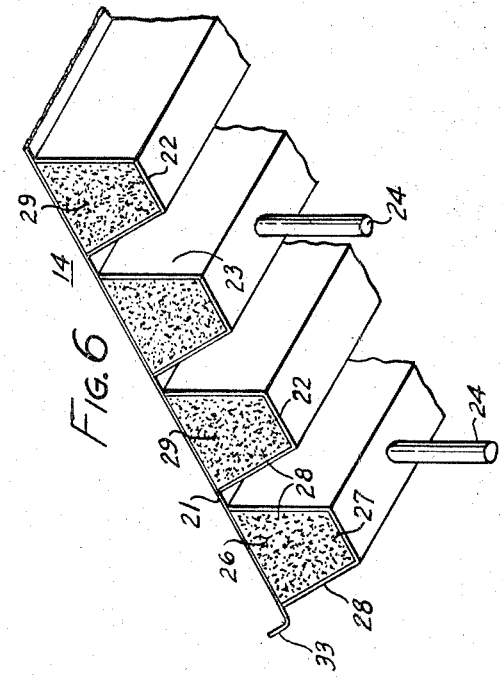

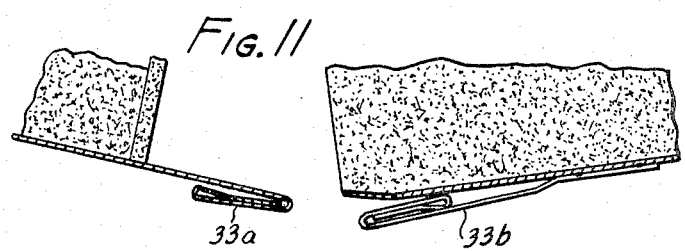
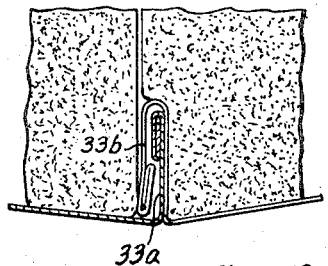
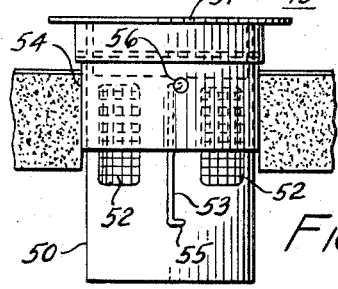
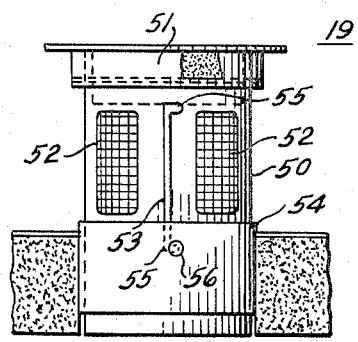
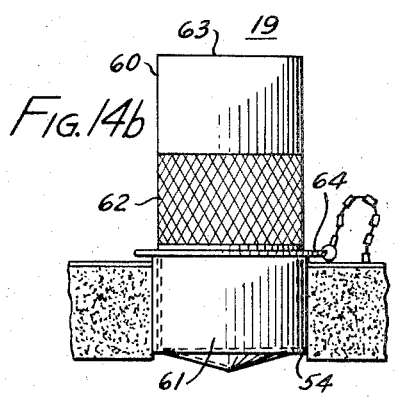
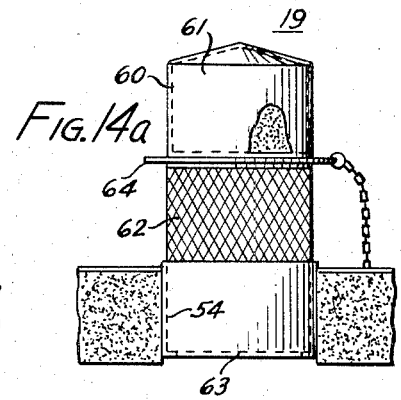
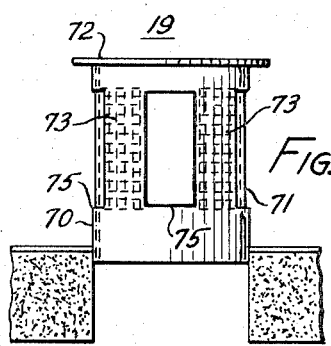
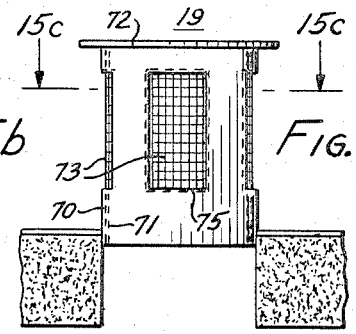
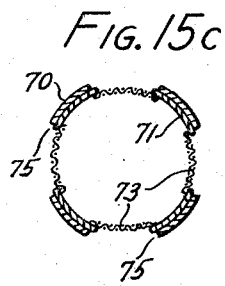

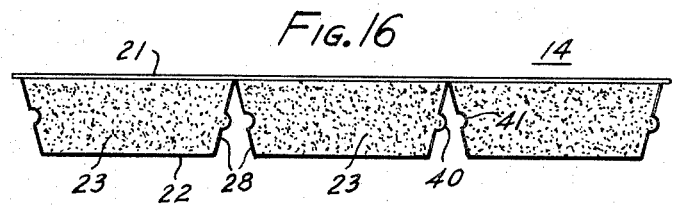
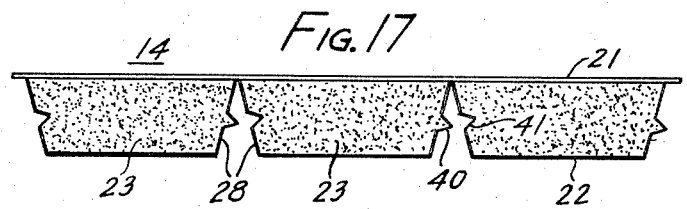
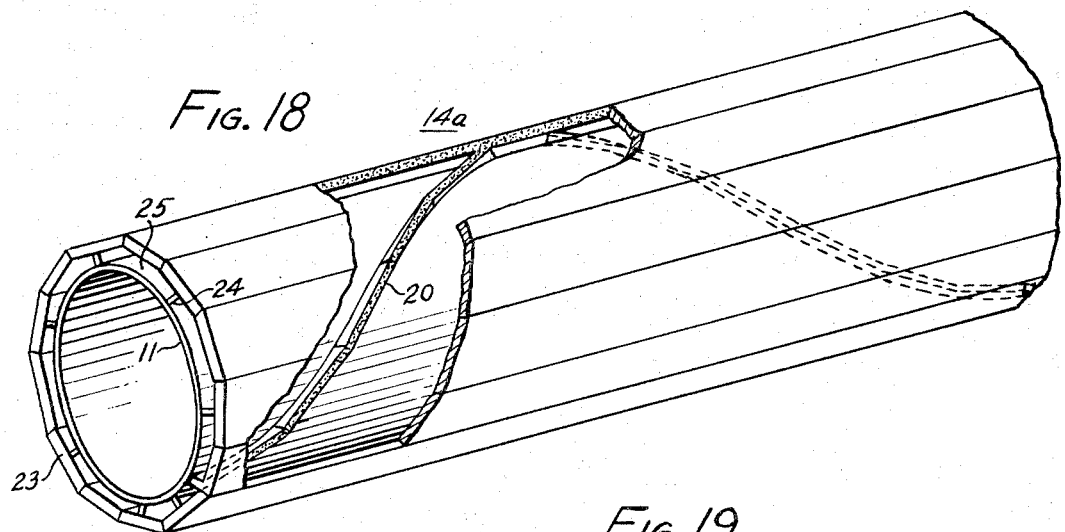
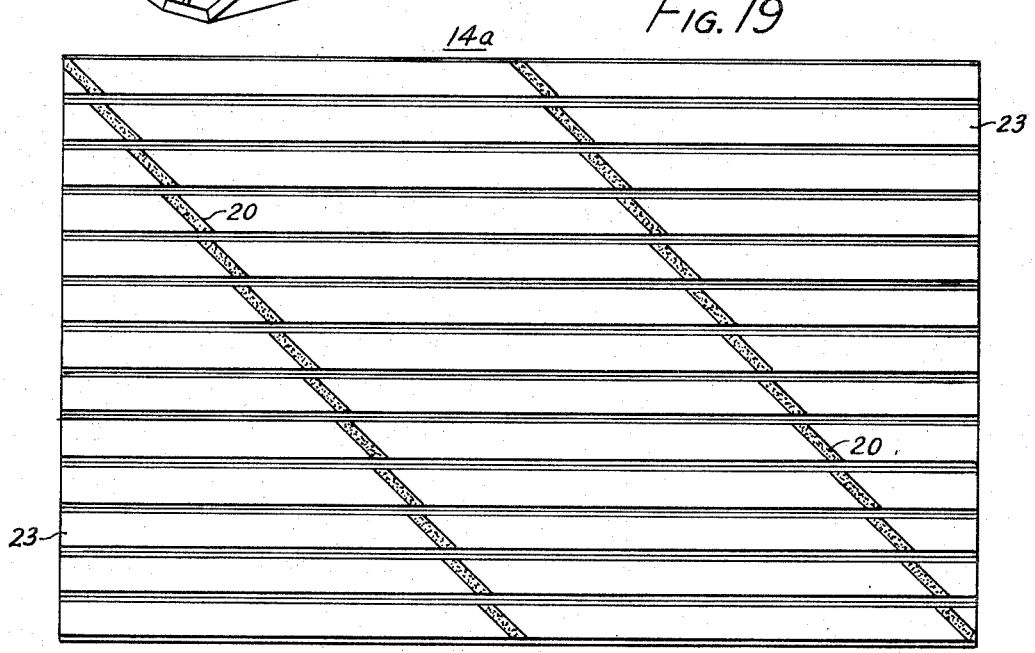

PIPE INSULATION SYSTEM

BACKGROUND OF THE INVENTION

The practice of transporting oil great distances from the oil fields, of both offshore and land installations, by overland pipeline is well known. With the discovery of large reservoirs of oil in the North Slope area of Alaska, however, the pipeline transportation of oil has received renewed attention. There are problems created by virtue of the nature of the Arctic terrain over which the pipeline must pass. It is necessary to carry a large portion of the pipeline above ground and it will be necessary in the above ground portion to thermally insulate the pipeline to prevent thawing of the permafrost by heat radiated from the hot (160° F.) oil flowing through the pipe. Furthermore, the oil flowing in the pipeline must be insulated against the freezing temperatures that would cause the oil to gel and impede the flow of the oil. An insulation system for any above ground pipeline which is in an isolated area must be ruggedly built and capable of carrying not only its own weight but loads from snow, ice, wind and accidental loads and be relatively maintenance free.

SUMMARY OF THE INVENTION

It is a primary object of this invention to provide a deformable insulation panel for draping around a pipe.

It is another object of this invention to provide a prefabricated insulation panel which can be easily and safely transported to the pipeline site.

It is still another object of the instant invention to provide a maintenance free insulated pipe system in an isolated region.

It is a further object of the instant invention to provide a deformable insulation panel for draping around a pipe with means to space the panel from the pipe and to vent the space between the pipe and the insulation.

The instant invention accomplishes these objects by providing an insulation panel which is prefabricated in a convenient location and adapted for transportation to distant points. The panels comprise outer and inner deformable skin surfaces with serially arranged truncated segments of foamed plastic material therebetween and include wooden blocks extending from the outer skin through the foamed plastic material and the inner skin surface to provide means to space the insulation panel from the pipe and also to support the insulation panel thereon.

BRIEF DESCRIPTION OF THE DRAWINGS

FIG. 1 is a plan view of an insulated pipeline system according to the instant invention;

FIG. 2 is an isometric view of a support column for the insulated pipeline system of the instant invention;

FIG. 3 is an isometric view showing a portion of an insulated fluid conduit according to the invention;

FIG. 4 is an end view of an insulated fluid conduit taken on line 4—4 of FIG. 3;

FIG. 5 is a detailed fragmentary section of a deformable laminated insulation panel of one embodiment showing V-shaped grooves in the insulation;

FIG. 6 is a detailed fragmentary section of a deformable laminated insulation panel of one embodiment showing truncated V-shaped grooves in the insulation;

FIG. 7 is a fragmentary sectional view of a portion of an insulated fluid conduit showing means for spacing the insulation from the fluid conduit;

FIG. 8 is a fragmentary view of a curved portion of an insulated pipeline system showing a bellows-type joint band;

FIG. 9 is a transverse section through a prefabricated insulation panel;

FIG. 10 is a detailed view of one means for the field connection of the longitudinal edges of the prefabricated insulation panel;

FIG. 11 is a detailed view of an alternate means for connecting the longitudinal edges of a prefabricated insulation panel in the field;

FIG. 12 shows in detail still another alternate means for making a field connection of the longitudinal edges of a prefabricated insulation panel;

FIG. 13a is a detail of one means for venting the insulated pipeline system of the instant invention showing the vent open;

FIG. 13b is a detail of the vent shown in FIG. 13a in the closed position;

FIG. 14a is a detail of an alternate means for venting the insulated pipeline system in an open position;

FIG. 14b is a detail of the vent means of FIG. 14a shown closed;

FIG. 15a is a detail of still another means for venting the insulated pipeline system of the instant invention in the open position;

FIG. 15b is a detail of the vent of FIG. 15a in the closed position;

FIG. 15c is a sectional view of the vent of FIG. 15a taken along line 15c–15c of FIG. 15a;

FIG. 16 shows an alternate embodiment of the prefabricated deformable laminated insulation panel of the instant invention;

FIG. 17 shows still another embodiment of the prefabricated deformable laminated insulation panel of the instant invention;

FIG. 18 is an isometric view of the prefabricated deformable insulation panel of the invention having spirally wound spacer means on the inner surface thereof; and FIG. 19 is a plan view of the insulation panel of the invention showing projections for forming spirally wound spacer means.

DESCRIPTION OF THE PREFERRED EMBODIMENT

Referring now to the drawings for a detailed description of the invention, FIG. 1 is a plan view of a pipeline system according to the instant invention. Pipeline 10 generally comprises fluid conduit 11 shown having a curved portion 12 and straight portions 13 encased in insulation. Pipeline 10 is conveniently spaced by support means 16 for support from the ground and is provided with means to negotiate curves, either horizontal or vertical where necessary and to accommodate linear expansion in the pipeline. The fluid conduit 11 is encased in deformable laminated insulation panels 14 which are prefabricated at a manufacturing facility remote from the point of use and in convenient lengths for handling and joining in the field. At each joint between two adjacent panels there is an insulated joint band to be described more in detail later. A panel length of 25 ft. has been found to be convenient in the pipeline shown in FIG. 1 which is supported every 50 ft. Saddle joint band 15 joins two panels of insulation at a support 16 and joint band 17 joins the insulation panels at intermediate points. Where a change of direction occurs either vertical or horizontal, as shown in FIG. 1, a bellows-type insulated panel joint 18 is installed. The bellows-type joint 18 provides a mechanism for closing the gap between two segments that are used to negotiate curves and also provides for linear expansion of the pipeline.

The saddle joint 15 occurs at each point of support 16 of the pipeline 10. The pipeline system 10 in FIG. 1 is provided with convective air vent means 19 which serve to ventilate the system in hot weather and are easily closed during the cold seasons. The vents 19 are designed to prevent rain and foreign matter from entering the annular air space between the fluid conduit 11 and the insulation material when the vents 19 are in the open position.

FIG. 2 is an isometric view of a pipe support 16 showing the saddle joint 15 connecting two adjacent insulation panels 14 at a point of support for the pipeline 10. The air vents 19 located in the saddle joint 15 serve as the air intake to effect convective cooling of the pipeline. They are located near the bottom of the pipeline adjacent to the in-field joint seam, to be described later, one vent on either side of the saddle joint 15. All vents 19 are shown located in joint bands 15, 17 or 18, however, if desirable the vents 19 can be easily located in the panels 14 as well.

A detailed description of the insulation panel of the instant invention follows with particular reference to FIGS. 3–7 inclusive. The insulation panel 14, as hereinbefore noted, is a prefabricated laminated panel of insulation and comprises a deformable outer skin 21, a deformable inner skin 22, a plurality of serially arranged spaced truncated triangular prisms of insulation material 23 and wooden blocks 24. The outer skin which is a weather and damage resistant sheath for the insulation consists of a hand deformable material as e.g. 0.04" thick galvanized sheet metal. Other weather resistant hand deformable materials that would serve equally as well will be apparent to those skilled in the art, as e.g. light gage aluminum sheet. All materials suitable for use as the hand deformable outer skin 21 may be primed on the inner surface thereof with a neoprene primer to insure additional bonding to the insulation material 23.

The truncated triangular prisms 23 which form the core of the insulation panel 14 comprise a foamed plastic material, e.g. rigid polyurethane foam having a nominal density in the range of about 1.6 pcf to about 3.0 pcf to provide adequate insulation at minimum cost. The inner skin 22 is a foil-like membrane of a material which is impervious to both air and moisture and may have an outer heat reflective surface. The heat reflective surface of the inner skin 22 reflects heat radiated from hot pipelines, thereby minimizing the surface temperature rise of the foam insulation and reducing degradation of the foamed material. The inner skin 22 acts as a vapor barrier to prevent the foamed material adjacent the pipeline from "aging" with the consequent decrease in insulation efficiency. A preferred material for the inner skin is aluminum foil which is laminated to "Mylar" polyester film on the outer surface and which may be primed on the inner surface with a neoprene primer that would insure additional bonding to the foamed plastic insulation material 23. It will be clear to those skilled in the art that other suitable materials for the inner skin in addition to aluminum foil and having the required properties, i.e. impervious to air and moisture and hand deformable would be applicable.

The wooden blocks 24 seen in FIG. 7 are cast in the rigid foam triangular prisms 23 extending from the outer skin 21 through the prism 23 and the inner skin 22 to space the insulation panel 14 from and support the panel 14 on the fluid conduit 11 when the insulation panel 14 is draped around the fluid conduit 11. An annular space 25 is thus formed between the fluid conduit 11 and the insulation panel 14. The annular air space 25 is used for obtaining convective cooling through the use of an air-intake and vent system. An extension section 24a removably attached to wooden block 24 may be provided in any convenient length to provide the necessary spacing of the insulation 14 from the fluid conduit 11. The spacing means is shown in the preferred embodiment as being made from redwood blocks, however, it is clear that there are many other suitable materials that will serve the same purpose.

One important feature of the wooden spacing blocks 24 is that they support the load of the insulation panel and any external load applied thereto transmitting the loads to the fluid conduit 11. The foam segments 23 are thus kept stress-free during shipment of the insulation panels since the wooden blocks of overlaying panels will be aligned so that the weight of the panels is carried to the carrier or truck bed by the wooden blocks, and when the panel is placed around a pipe the dead and live loads on the insulation segments are transmitted to the wooden pins or blocks 24 from the metal skins and thence to the supporting pipe.

By adjusting the length of the wooden extension 24a gradual bends in the pipeline can be negotiated. This produces, in effect, a varying clear air space 25 between the pipe and inner surface of the insulation panel 14. The wooden block is mechanically locked to the foam and thus prevents gross movement of the foam in the event of foam-metal skin bond failure.

Referring particularly to FIGS. 5 and 6 two embodiments of the insulation panel are shown. In both embodiments the truncated triangular prisms 23 are seen to comprise a wide base 26 adhered to the outer skin 21 and a narrow base 27 with tapered sides 28 connecting the wide base and narrow base. The inner skin 22 is adhered to the tapered sides 28, the narrow base 27 and the outer skin 21 completely encapsulating the rigid foam structure of each of the triangular prisms 23 except at the ends 29 thereof. It will be clear to those skilled in the art that where necessary the ends may also be closed with the same inner skin 22 material. The encapsulation of the insulation material prevents moisture, air and heat from entering the material and thereby deteriorating it.

FIG. 5 is a fragmentary view of one embodiment of the deformable laminated insulation panel 14 showing the spaced truncated triangular prisms 23 of insulation material with the wide bases 26 thereof adhered to the outer skin 21 serially arranged to form V-shaped grooves between adjacent truncated triangular prisms 23.

FIG. 6 is a fragmentary view of another embodiment of the deformable laminated insulation panel 14 in which the spaced truncated prisms 23 are serially arranged to form truncated V-shaped grooves between adjacent truncated prisms 23. The advantage of this technique is that it facilitates bending of the outer deformable skin 14 without crushing the foam insulation material 23 locally at the apex of the V-shaped grooves which could lead to foam de-lamination.

As hereinbefore noted the deformable laminated insulation panels 14 are manufactured in a facility remote from the ultimate point of use and are easily transported in the flat position in which they are formed. The outer skin comprises several sections of convenient sized galvanized sheet metal joined together by a factory lock seam joint 32. The sheet thus formed provides the top of the form for containing the polyurethane foam material. The bottom and sides of the form may be a concrete box having water circulation pipes cast near the surface thereof to maintain the proper curing temperature during reaction of the foam material. V-shaped or truncated-shape silicone rubber segments are placed on the bottom surface of the concrete box serially arranged to the desired spacing of the triangular prisms 23 of insulation material. The foil-like material of the inner skin 22 is draped over the rubber segments and by means of a vacuum is pulled down tightly onto the segments. Redwood pins are inserted through the inner skin into sockets provided in the concrete box bottom surface. Foam material is then spread evenly over the contrete box form to the proper depth and the galvanized sheet metal outer skin 21 placed on top. The foam reacts and expands under controlled conditions and when cured results in a deformable laminated insulation panel 14 having a rigid foam core between outer skin 21 and inner skin 22 and adhered thereto and having wooden blocks or pins 24 cast therein projecting from the inner skin 22.

The panels 14 are provided with two mating longitudinal edges 33 which are formed free of any insulation material to facilitate joining in the field when a panel 14 is draped around a pipe. A single simple-lapped joint 34 as seen in FIGS. 3 and 4 is made in the field. FIG. 10 shows a single simple-lapped dimpled field joint for connecting the mating edges 33. The advantages of this type joint are simplicity, strength and elimination of mechanical parts.

Other connections that may be used as in-field joints are shown in FIGS. 11 and 12 which show a snap-lock type of connection in which the mating edges 33a and 33b are pushed together to lock the edges in place.

It may be desirable to incorporate a compressible gasket for additional waterproofing in these connections as will be understood.

The bellows-type joint band 18 referred to hereinbefore is seen in FIG. 8 to which particular reference is now made. The bellows-type joint band 18 used for joining two adjacent insulation panels 14 at a point of change of direction, either horizontal or vertical, of the insulated pipe comprises spaced joining bands 30 with an expandable section of metal or metal bellows 31 therebetween. The joining bands 30 overlap the ends of the adjacent insulation panels 14 and include a strip of gasket material (not shown) placed between the bands 30 and the outer skin 21 of the panels 14. An insulating bat of suitable compressible material is inserted on the inside of the bellows section extending between the end sections of the insulation panels 14. The joint band 18 is draped around the pipe and a field joint made to affix it on the pipeline in a manner similar to making field joints for the insulation panels 14 described herein.

FIG. 10 shows a detail of one means for making a field connection of the overlapping edges of the insulation panels 14 as described hereinbefore. This connection or the alternate connections seen in FIGS. 11 and 12 may be used in connecting the joint bands 15, 17 or 18.

FIG. 13a shows the open position of one embodiment of vent means 19 for venting the pipeline 10. FIG. 13b is a view of the same vent in the closed position. The vent means shown in FIGS. 13a and 13b comprises a cylindrical member 50 with an insulated cap 51 and having screened openings 52 and a slot 53. Sleeve 54 is affixed to an opening in the joint band adapted to receive the cylindrical member 50 in slidable engagement. Pin 56 is mounted on the sleeve projecting inwardly. The slot 53 is provided with offsets 55 at the upper and lower ends thereof whereby the pin 56 engages the offset in the slot to lock the cylindrical member 50 in an open position as in FIG. 13a or a closed position as in FIG. 13b.

FIG. 14a shows the open position and FIG. 14b the closed position of an alternate embodiment of vent means 19 comprising a cylindrical member 60 having an insulated cap 61 at one end and an open end 63 at the opposite end with a screened section 62 therebetween. As in the vent means described above sleeve 54 is provided in a joint or panel opening for slidable engagement of cylindrical member 60. The member 60 is inserted into sleeve 54 with the cap 61 projecting downwardly to close the vent and with the open end 63 projecting into sleeve 54 to open the vent. A collar 64 is attached to cylindrical member 60 at the jointure between the insulated cap 61 and the screened section 62. The collar 64 provides a shield against rain entering the vent and furthermore provides the means for supporting the vent means 19 on the outer deformable skin 14 in the desired position, either open or closed.

FIG. 15b shows the closed position and FIG. 15a the open position of still another embodiment of vent means 19 which comprises a cylindrical member 70 fixedly mounted in the outer skin of the joint or panel being vented. Another cylindrical member 71 with cap 72 is rotatably mounted within cylindrical member 70. Cylindrical member 71 has spaced screened openings 73 around its circumference and sized so that when in registry with like size openings 75 in cylindrical member 70 an open vent is provided and when the screened openings 73 are not in registry with openings 75 the vent is closed.

FIGS. 16 and 17 show two embodiments of means for sealing the space between adjacent truncated prisms 23 when the panels 14 are folded around a pipe to be insulated. The seal provides insurance against any leakage of hot or cold air along the planes formed by folding the tapered sides 28 of two adjacent prisms 23 against each other. The alternating ribs 40 and correspondingly shaped grooves 41 mate to form the seal. The ribs and grooves may be convex and concave respectively as shown in FIG. 16 or any other pattern that will form mating surfaces as e.g. as shown in FIG. 17. The ribs are generally longitudinally coextensive along the tapered sides 28 of the prisms 23.

FIG. 18 shows an isometric view of a fluid conduit 11 with deformable laminated insulation panel 14a having spacer means 20 cast integrally with the panel 14a to form a spiral pattern on the inner skin 22 of panel 14a when folded around a fluid conduit 11. FIG. 19 is a developed view of the insulation panel 14a prior to folding around a pipe. When folded around fluid conducting conduit 11 the inwardly directed spiralled projections 20 of insulation panel 14a provide a directed passageway for venting the annular space 25 between the fluid conduit 11 and the insulation panel 14a.

The invention described herein thus provides a metal-foam composite insulation panel which may be shipped flat, easily draped around a pipe and includes locating pins cast in the insulated material to properly space the insulation from the pipe and to relieve mechanical stresses on the foam during shipment and in service. Fluid conduit construction which incorporates the insulation panel of the invention can be erected with simple hand tools, provides an annular air space around the pipe, accommodates moderate bends and is easily joined with a waterproof sealing joint.

We claim:
1. A deformable laminated insulation panel comprising:
 a. a first deformable skin,
 b. a plurality of serially arranged spaced truncated triangular prisms of insulating material each having a wide base, a narrow base and tapered sides, each wide base adhered to the first deformable skin,
 c. a second deformable skin adhered to each of the tapered sides and narrow base and to the first deformable skin and
 d. means extending through the truncated prisms and the second deformable skin for spacing the insulation panel from and supporting the insulation panel on a member to be insulated.

2. A deformable laminated insulation panel according to claim 1
 wherein the truncated triangular prisms comprise a foamed plastic material.

3. A deformable laminated insulation panel according to claim 1
 wherein the first deformable skin is sheet metal.

4. A deformable laminated insulation panel according to claim 1
 wherein the second deformable skin has an outer heat reflective surface.

5. A deformable laminated insulation panel according to claim 1
 wherein the second deformable skin has an outer surface which is impervious to air and moisture.

6. A deformable laminated insulation panel according to claim 1
 wherein the second deformable skin is impervious to air and moisture and has an outer heat reflective surface.

7. A deformable laminated insulation panel comprising:
 a. a first deformable skin,
 a plurality of serially arranged spaced truncated triangular prisms of insulating material each having a wide base, a narrow base and tapered sides, each wide base adhered to the first deformable skin,
 c. a second deformable skin adhered to each of the tapered sides and narrow base and to the first deformable skin, and
 d. a plurality of wooden blocks extending through the truncated triangular prisms and the second deformable skin for spacing the insulation panel from and supporting the insulation panel on a member to be insulated.

8. A deformable laminated insulation panel according to claim 1
 wherein adjacent tapered sides of the serially arranged truncated triangular prisms are provided with alternating ribs and correspondingly shaped grooves.

9. A deformable laminated insulation panel according to claim 8
 wherein the alternating ribs are convex and the correspondingly shaped grooves are concave and are longitudinally coextensive.

10. A deformable laminated insulating panel according to claim 7
 wherein the wooden blocks comprise a section extending from the first deformable skin through the truncated triangular prisms and the second deformable skin, and an extension section removably attached to the first section adjacent the second deformable skin.

11. A deformable laminated insulation panel comprising:
 a. a first deformable sheet metal skin,
 b. a plurality of spaced truncated triangular prisms of foamed plastic material each having a wide base, a narrow base and tapered sides, each wide base serially arranged on and adhered to the first deformable skin to form grooves between adjacent truncated triangular prisms,
 c. a second deformable skin having an inner surface adhered to each of the tapered sides and narrow base and to the first deformable skin and having an outer heat reflective surface impervious to air and moisture, and
 d. wooden blocks selectively cast in the truncated triangular prisms in contact with the first deformable skin and extending through the truncated triangular prism and the second deformable skin.

12. A deformable laminated insulation panel according to claim 11
 wherein the serially arranged wide bases of the truncated triangular prisms are spaced to form grooves between adjacent truncated triangular prisms.

13. A deformable laminated insulation panel according to claim 11
 wherein the serially arranged wide bases of the truncated triangular prisms are spaced to form truncated V-shaped grooves between adjacent truncated triangular prisms.

14. A fluid conduit construction comprising:
 a. an outer shell,
 b. an inner fluid conducting conduit,
 c. insulation material between the outer shell and the conduit,
 d. means extending from the outer shell through the insulation material to the conduit to space the insulation material from the conduit,
 e. a heat reflective vapor barrier adhered to the insulation material between the insulation material and the conduit, and
 f. means to vent the space between the insulation material and the conduit.

15. A fluid conduit construction comprising:
 a. an outer shell,
 b. an inner fluid conducting conduit, c. insulation material between the outer shell and the conduit,
d. means to space the insulation material from the conduit which includes wooden blocks extending from the outer shell through the insulation material to the conduit,
e. a heat reflective vapor barrier adhered to the insulation material between the insulation material and the conduit, and
f. means to vent the space between the insulation material and the conduit.

16. A fluid conduit construction according to claim 14 wherein the means to vent the space between the insulation material and the conduit includes openings through the outer shell, the insulation material and the vapor barrier.

17. A fluid conduit construction according to claim 14 wherein the insulation material includes inwardly directed spiralled projections.

18. A fluid conduit construction comprising:
a. an outer shell,
b. an inner fluid conducting conduit,
c. a plurality of serially arranged spaced truncated triangular prisms of insulating material between the outer shell and the conduit, each having a wide base, a narrow base and tapered sides and each wide base adhered to the outer shell,
d. means extending from the outer shell through the insulation material to the conduit to space the insulating material from the conduit,
e. a heat reflective vapor barrier adhered to each of the tapered sides and narrow base and to the outer shell, and
f. means to vent the space between the insulating material and the conduit.

19. An insulated pipeline system having a straight portion and a curved portion and a plurality of joints connecting successive panels of insulation comprising:

a. a fluid conducting conduit,
b. an outer shell surrounding and spaced from the conduit,
c. insulation material between the outer shell and the conduit and spaced from the conduit,
d. a heat reflective vapor barrier adhered to the insulation material between the insulation material and the conduit,
e. wooden blocks extending through the heat reflective vapor barrier and the insulation material to the outer shell to support the outer shell and insulation material on the conduit,
f. means to vent the space between the insulation material and the conduit,
g. an insulated joint band at each circumferential joint along the straight portion of the pipeline,
h. an insulated bellows-type joint band around the outer shell at each circumferential joint along a curved portion of the pipeline,
i. intermittent pipeline supports,
j. an insulated pipe saddle located at each pipeline support, and
k. an insulated circumferential joint band around the outer shell at each pipe saddle.

20. A pipeline system according to claim 19 wherein the insulation material includes inwardly directed spiralled projections.

* * * * *